July 30, 1963 L. H. ELFORD 3,099,385
TURBO BLOWERS
Filed March 6, 1961
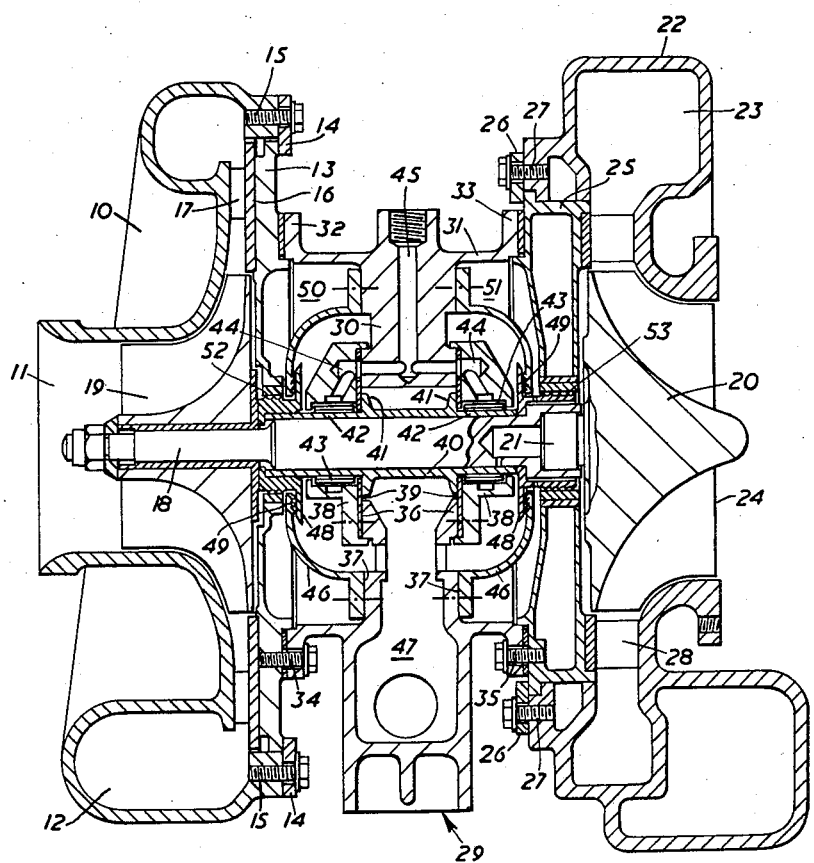
INVENTOR
LIONEL H. ELFORD
BY
Watson, Cole, Grindle & Watson
ATTORNEYS United States Patent Office 3,099,385
Patented July 30, 1963

3,099,385
TURBO BLOWERS
Lionel Harvey Elford, Greenford, England, assignor to D. Napier & Son Limited, London, England, a company of Great Britain
Filed Mar. 6, 1961, Ser. No. 93,773
Claims priority, application Great Britain Mar. 7, 1960
3 Claims. (Cl. 230—116)

This invention relates to turbo blowers of the kind comprising a turbine and a compressor, the rotors of which are mounted coaxially on a common shaft supported by axially-spaced bearings mounted in a central casing disposed between the turbine housing and the compressor housing. Such turbo blowers are commonly used with diesel engines, the turbine being driven by the engine exhaust gases and in turn driving the compressor which compresses the air supplied to the engine. Also, in some installations turbo blowers are arranged to deliver refrigerated charging air. For example, the compressed air delivery from a first turbo blower unit driven by engine exhaust gases is fed through the blower of a second turbo blower unit which increases its pressure still further, then through an intercooler, then through the turbine of the second unit where it undergoes a partial drop in pressure and is also cooled by expansion, and finally passes in the form of refrigerated charging air to the engine air intake. The present invention is applicable more particularly, but not exclusively, to turbo blowers suitable for use with diesel engines, whether in the form of simple units for compressing the charging air, or in the form of more complex arrangements as described above for both refrigerating and compressing the charging air.

It is an object of the invention to provide a turbo blower of the kind specified which is of simple, light and inexpensive construction and which is easy to dismantle and reassemble for the purposes of maintenance or inspection.

According to the present invention, in a turbo blower of the kind specified, the central casing has a transverse annular web through which the shaft passes and on opposite sides of which are mounted two bearing assemblies for the shaft.

Each bearing assembly may comprise a fixed housing attached to the annular web, and a floating ring interposed between the shaft and the fixed bearing housing. In operation, the cylindrical sleeve will rotate at a slower speed than the shaft, so that the relative speeds of the bearing surfaces are less than would be the case with a conventional plain bearing. Further, with the floating ring bearing, the total radial clearance may be greater than with a conventional plain bearing. An advantage of this is that the rotor assembly need not be so accurately balanced as would otherwise be necessary, since if the natural axis of rotation of the rotor assembly does not exactly coincide with the geometrical longitudinal axis, the resulting slight eccentricity or eccentricities can be accommodated.

Each bearing assembly may also include a thrust bearing comprising an annular plate clamped between the fixed housing of the bearing assembly and the annular web of the central casing, a portion of this annular plate projecting inwardly of the central aperture of the annular web towards the shaft, and a flange on the shaft co-operating with this projecting portion of the annular plate.

In one form of the invention bearing enclosure shells are fixed to opposite sides of the annular web of the central casing, outside the bearing assemblies, each shell providing a compartment which accommodates one of the bearing assemblies.

Seals, for instance labyrinth seals, may be provided between the shaft and the bearing enclosure shells, the bottoms of the compartments formed by the shells communicating with a lubricant drain passage in the lower part of the annular web of the central casing. Where the seals are of the labyrinth type each may consist of a plurality of concentric circular grooves in the wall of the bearing enclosure shell adjacent the shaft and a flange on the shaft close to the grooves, the grooves all being inclined outwardly with respect to the shaft axis so that when the shaft is horizontal the upper parts of the groove face upwardly, whereas the lower parts of the same grooves face downwardly.

The bearing enclosure shells may be spaced from the inner walls of the turbine and compressor housings, the intervening spaces being open to the atmosphere.

To facilitate manufacture, it is desirable that, at each side of the annular web of the central casing, the surface to which the respective bearing assembly is attached is in the same plane as the surface to which the respective bearing enclosure shell is attached. Thus, both these surfaces can be machined in the same operation.

The central casing may have a generally cylindrical body portion surrounding the annular web, the inner walls of the turbine and compressor housing being attached to outwardly-directed flanges at opposite ends of the body portion. The attachment screws or the like are thus readily accessible, which facilitates assembly and dismantling.

The invention may be performed in various ways, and a specific embodiment will now be described by way of example with reference to the accompanying drawing which is a section through this embodiment in a vertical plane containing the shaft axis.

The turbo blower shown in the drawing comprises a compressor housing consisting of a front or outer portion 10 having central air intake 11 and a volute discharge chamber 12, and a rear or inner wall portion 13. The outer housing portion 10 is attached to the inner wall 13 by means of a clamping ring 14 and screws 15. Clamped between the outer housing portion 10 and the inner wall 13 is a diffuser plate 16 carrying diffuser vanes 17.

Mounted on a shaft 18 is a compressor rotor 19 of the centrifugal type. When the shaft 18 is rotated, air is drawn in through the intake 11, compressed by means of the rotor 19, has some of its kinetic energy converted to pressure energy in the diffuser 16, 17, and passes into the volute discharge chamber 12 in a compressed state.

At its right-hand end the shaft 18 is connected to a turbine rotor 20 of the inward-flow type by a detachable connection 21. The turbine rotor 20 is mounted in a turbine housing 22 consisting of a front or outer portion which has an inlet volute chamber 23 and an axial outlet 24, and a rear or inner wall portion 25. The outer housing portion 22 is clamped to the inner wall 25 by means of a clamping ring 26 and screws 27. The inner wall 25 is hollow, to reduce transfer of heat from the turbine towards the left in the drawing. Clamped between the inner wall 25 and the turbine casing 22 is a guide vane or nozzle ring 28 which is provided with guide vanes or nozzles to direct exhaust gases into the turbine rotor 20 at the appropriate entry angle.

Between the compressor housings 10, 13 and the turbine housing 22, 25 is a central casing 29. This consists of a transverse annular web 30, a generally cylindrical body portion 31, and outwardly directed radial flanges 32 and 33 at the ends of the body portion. The inner wall 13 of the compressor housing and the inner wall 25 of the turbine housing are detachably connected to these flanges by screws 34 and 35, respectively, which screws are readily accessible from outside the turbo blower.

The annular web 30 has flat inner annular seating surfaces 36 on opposite sides thereof, and flat outer annular seating surfaces 37 on opposite sides thereof, the surfaces 36 and 37 on each side being in the same plane so that they can be machined in the same operation.

Bolted against the inner annular seating surfaces 36 are bearing housings or bodies 38, an annular thrust bearing plate 39 being clamped between each bearing housing and the corresponding seating surface. A portion of each thrust plate 39 projects inwardly of the central aperture of the annular web 30 towards the shaft 18. Mounted on the shaft to rotate therewith is a sleeve 40 having a pair of radial flanges 41 which engage the said projection portions of the thrust plates 39 to locate the shaft 18 and hence the rotors 19 and 20 in the axial direction, and transmit any residual axial thrust to the thrust plates 39 and thence to the central casing 29. The sleeve 40 also has cylindrical journal bearing portions 42. Surrounding these portions within the bearing housings 38 are floating rings 43 each of which consists of a rigid cylindrical sleeve which supports a thin cylindrical liner of bearing material, this liner being spaced by a small clearance from the corresponding bearing portion 42 of the shaft sleeve 40. Each floating ring 43 is accommodated in a cylindrical recess in the corresponding bearing housing 38, which recess is lined with bearing metal. The bearing housings 38 have passages 44 which communicate with an oilway 45 in the central casing 29, for the supply of lubricating oil to the bearings.

Bolted against the outer seating surfaces 37 of the annular web 30 are bearing enclosure shells 46. Each shell 46 encloses a compartment which accommodates one of the bearing assemblies. The bottom each compartment communicates with a lubricant drain passage 47 in the lower part of the annular web 30. Lubricant which leaks outwardly from the journal bearings into the said compartments drains into the passage 47 from the bottoms of these compartments, while lubricant which leaks inwardly from the journal bearings serves to lubricate the thrust bearings and then drains into the passage 47 through the hollow interior of the web 30. The shells 46 are sealed to the shaft sleeve 40 by annular face seals of the labyrinth type. Each such seal comprises a flat radial flange 48 mounted on the shaft sleeve 40 and a plurality of circular grooves 49 on the inner surface of the respective shell, the lands between the grooves being spaced by only a small axial clearance from the flange 48. The side walls of the grooves are inclined outwardly with respect to the shaft axis so that the upper parts of the grooves face upwardly and the lower parts face downwardly. Oil draining down the inside wall of the upper part of the bearing shell 46 will enter the upwardly-facing grooves, run round in these grooves, and then run out of the downwardly-facing part of the grooves below the shaft into the bottom of the compartment. The bearing enclosure shells 46 thus enclose the bearing assemblies in an oil-tight manner and prevent oil from leaking out of the central casing 29. The bearing shells 46 are spaced from the inner wall 13 of the compressor housing and from the inner wall 25 of the turbine housing by spaces 50 and 51 respectively. These spaces are open to the atmosphere through a vent in the central casing 29 which is not visible in the drawing. There is therefore no prospect of pressure building up in the bearing compartments due to gas leakage along the shaft 18 from the turbine or compressor. This feature is of particular value where the turbo blower is fitted to an engine, and the lubrication system for the turbo blower bearings is connected to the lubrication system of the engine, since it precludes any possibility of the engine oil reservoir becoming pressurised due to gas leakage from the turbine or compressor, and it also prevents fouling of the lubricating oil by dirt particles which may be present in the air being compressed or in the exhaust gases.

To reduce gas leakage from the compressor housing and from the turbine housing, labyrinth seals 52 and 53 are provided between the inner walls 13 and 25 of the respective housings and cylindrical extensions of the sealing flanges 48 on the shaft.

As will be apparent from the foregoing description of a specific embodiment, turbo blowers embodying the invention can be of light construction, and the individual components can be of relatively simple shapes for ease and cheapness of manufacture. Moreover, assembly and dismantling can be carried out in a simple and straightforward manner. The assembly of the central casing and the parts contained therein can be performed directly, without adjustments having to be made during the assembly operation.

What I claim as my invention and desire to secure by Letters Patent is:

1. A turbo blower comprising a shaft having two ends, a turbine rotor on one end of said shaft, a compressor rotor on the other end of said shaft, a turbine housing, a compressor housing, a central casing disposed between said turbine housing and said compressor housing, means connecting said housings to said central casing, a transverse annular web integral with said central casing and having a central aperture through which said shaft passes, two axially spaced thrust bearing means for said shaft adjacent said transverse annular web on opposite sides thereof between said web and said housings, each of said thrust bearing means comprising a body, an annular plate for transmitting thrust between the annular web and the shaft disposed between said body and said annular web with a portion of said annular plate projecting inwardly of said central aperture of the annular web towards said shaft, and a flange on said shaft in co-operative thrust bearing relation with said projecting portion of said annular plate, and two journal bearings for the shaft from the central casing, each supported axially from one of the bearing means.

2. A turbo blower according to claim 1 comprising bearing enclosure shells, and means connecting said shells to said annular web on opposite sides thereof surrounding said thrust bearing means, said shells providing compartments accommodating said thrust bearing means.

3. A turbo blower according to claim 2 in which each of said opposite sides of said annular web has a first flat surface to which said thrust bearing body is supportingly connected and a second flat surface to which said bearing enclosure shell is connected, and said first and second flat surfaces are coplanar.

References Cited in the file of this patent
UNITED STATES PATENTS

| | | |
|---|---|---|
| 2,418,901 | Read | Apr. 15, 1947 |
| 2,541,850 | Wade | Feb. 13, 1951 |
| 2,646,210 | Kohlmann et al. | July 21, 1953 |
| 2,938,659 | Judson et al. | May 31, 1960 |
| 2,973,135 | Greenwald | Feb. 28, 1961 |